May 15, 1934.  W. GOTTLIEB  1,958,851
WINDSHIELD WARMER
Filed Oct. 26, 1931
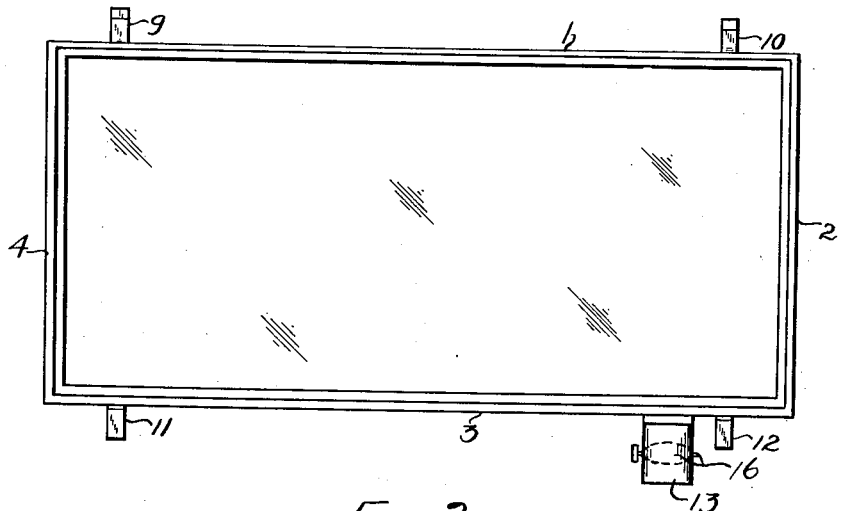
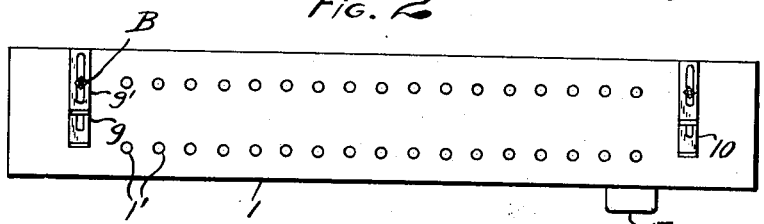
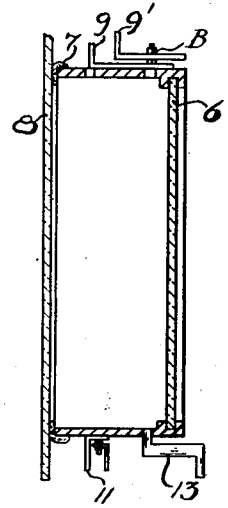
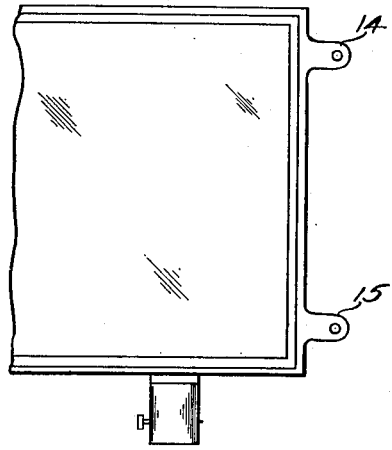
INVENTOR
William Gottlieb
BY
ATTORNEY Patented May 15, 1934

1,958,851

UNITED STATES PATENT OFFICE 1,958,851

WINDSHIELD WARMER

William Gottlieb, Sparrowbush, N. Y.

Application October 26, 1931, Serial No. 571,051

2 Claims. (Cl. 20—40.5)

The device, the subject of this invention, is intended as a means for keeping the windshields of automobiles or other vehicles free from ice, snow or sleet and has for its special object the provision of such a device that will be non-mechanical in its operation and particularly to the extent that it has no continuously moving parts, the only movable or moving parts being the securing means.

From experiments that I have conducted, I have discovered that if a windshield is kept warm, an ordinary windshield wiper can wipe away snow or ice just as freely as rain is wiped away and that if the windshield is kept warmed, the snow or ice will melt and run down the windshield and will not pile up to an extent to make the ordinary windshield wiper inoperative.

I am aware that windshield warmers have been suggested in the past, but such devices have been electrical or have employed candles or oil lamps for the production of the heat.

Another object of my invention is to prevent steam forming on the windshield. The steam or mist which usually forms on the interior of the windshield of an enclosed car is due to the difference in temperature between the inner and outer surfaces of the windshield, thus causing the breath of the occupants of the automobile to be condensed on the windshield to a very annoying extent. By keeping the glass warmed this fogging is overcome.

The following is what I consider the best means of carrying out my invention and the accompanying drawing should be referred to for a complete understanding of the specification which follows.

In the drawing:

Fig. 1 shows a front elevation of my device.

Fig. 2 is a top plan view.

Fig. 3 is a sectional view, and

Fig. 4 is a fractured view showing a modification of my securing means.

Similar reference numerals indicate like parts in all the figures where they appear.

My device is formed of a front having four sides as shown at 1, 2, 3 and 4. The front and back portions of my frame are normally open, but the frame is provided with a recess for the reception of a glass as shown at 6 and at the front open edge of the frame I provide a gasket or padding 7 which is to be brought into close contact with the glass 8 of the windshield.

I provide suitable clamps for securing my device in position and such clamps are shown at 9, 10, 11 and 12. The construction of the clamps is best seen in Fig. 3 and each clamp consists of two parts, 9 and 9', both secured by a common bolt B. The upturned portion of the clamp 9 is engaged either in the windshield slot or in the frame for the windshield and thereupon the portion 9' is pushed forward and the bolt 10 is secured.

On some automobiles a shorter clamp as shown at 11 may be employed. I do require securing means and such securing means will be provided even though it is required to modify the construction thereof as will be later set forth.

In the top member 1 of the frame, I produce a plurality of small holes as shown at 1' and in the bottom I introduce a pipe 13 and this pipe, which may be oval, will conduct heated air into the casing. It will be noted that when my device is in position, the frame together with the glass of the windshield and the glass 6 of the frame makes a closed chamber. Heated air from the engine compartment or from a heater, with which most automobiles are now provided, will be introduced into my casing and the perforations 12 are so small that the air will be well distributed within the casing and will not pass immediately therefrom or directly upward from the pipe 13.

At 16, I show a regulating valve which may be a butterfly valve introduced into the pipe 13 for the purpose of controlling the flow of heated air therethrough.

It will of course be understood that my device may be of any size to fit a required windshield. It will be further understood, as previously stated, that other types of securing means can be provided and in Fig. 4, I show a simple securing means which consists of a plurality of lugs 14 and 15, through which suitable screws or bolts may be caused to pass. This modification is only shown to indicate that suitable modifications may be made within the scope of the appended claims without departing from the principle or sacrificing the advantages of the invention.

Having carefully and fully described my invention, what I claim and desire to obtain is:

1. In a windshield for vehicles, a casing, and means for retaining said casing closely adjacent to the windshield, said means comprising a plurality of clamps each formed with L-shaped members adjustable one upon the other.

2. The combination with a windshield of an oblong casing, a plurality of adjustable clamps, two arranged upon each of the longest sides of said casing, all of said clamps being formed of L-shaped members, both parts of each upper clamp being adjustable in relation one with the other.

WM. GOTTLIEB.